US005836639A

United States Patent [19]

Kleefeldt et al.

[11] Patent Number: 5,836,639

[45] Date of Patent: Nov. 17, 1998

[54] MOTOR-VEHICLE SLIDING-DOOR SYSTEM WITH ELECTRONIC CONTROLLER

[75] Inventors: Frank Kleefeldt, Heiligenhaus; Damien Labonde, Essen; Johannes-Theodor Menke, Velbert; Stefan Armbruster, Heiligenhaus; Thomas Schönenberg, Leverkusen, all of Germany

[73] Assignee: Kiekert AG, Heiligenhaus, Germany

[21] Appl. No.: 831,974

[22] Filed: Apr. 2, 1997

[30] Foreign Application Priority Data

| | | | |
|---|---|---|---|
| Apr. 2, 1996 | [DE] | Germany | 196 13 114.6 |
| Apr. 2, 1996 | [DE] | Germany | 196 13 116.2 |
| Jun. 1, 1996 | [DE] | Germany | 296 09 770 U |
| Jan. 25, 1997 | [DE] | Germany | 197 02 698.2 |
| Feb. 19, 1997 | [DE] | Germany | 197 06 393.4 |

[51] Int. Cl.[6] ........ B60J 5/06

[52] U.S. Cl. ........ 296/155; 296/155; 49/213; 49/360; 307/10.1

[58] Field of Search ........ 296/155; 49/213, 49/360; 307/10.1

[56] References Cited

U.S. PATENT DOCUMENTS

| | | | |
|---|---|---|---|
| 4,640,050 | 2/1987 | Yamagishi et al. | 49/213 |
| 5,140,316 | 8/1992 | DeLand et al. | 296/155 |
| 5,536,061 | 7/1996 | Moore et al. | 296/155 |
| 5,613,365 | 3/1997 | Kuhlman et al. | 296/155 |

FOREIGN PATENT DOCUMENTS

| | | | |
|---|---|---|---|
| WO 89/05894 | 6/1989 | Australia | 49/213 |
| 40 22 881 | 1/1992 | Germany . | |

*Primary Examiner*—Gary C. Hoge
*Assistant Examiner*—Kiran Patel
*Attorney, Agent, or Firm*—Herbert Dubno; Andrew Wilford

[57] ABSTRACT

A motor vehicle has a body, a door movable on the body between a closed position and an open position, an electric power source mounted in the body, and a latch having interengageable parts on the vehicle body and on the door engageable in a latched position to retain the door in the closed position, and an electrical actuator energizable to put the latch in an unlatched position. A drive on the body connected to the door is energizable from the source for moving the door between the open and closed positions and a battery is provided in the door separate from the body-mounted power source. An electronic controller in the door powered by the battery is connected to the latch actuator for operating same to unlatch the door and to a transmitter for transmitting a signal indicating the position of the door and of the latch. Another electronic controller in the body includes a receiver for receiving the signal from the transmitter in the door is connected to the drive and to the body power source for operating the drive in accordance with the signal received by the body receiver.

8 Claims, 8 Drawing Sheets

MOTOR-VEHICLE SLIDING-DOOR SYSTEM WITH ELECTRONIC CONTROLLER

FIELD OF THE INVENTION

The present invention relates to a motor-vehicle sliding-door system. More particularly this invention concerns such a system having an electronic controller.

BACKGROUND OF THE INVENTION

A standard motor vehicle has a body provided with at least one generally horizontal rail having a bent end portion and along which a sliding door is displaceable between a closed position in against the body and an open position out from the body.

Such a sliding-door assembly is typically provided on minivans intended for passenger use as the back doors, as they allow the passengers in and out of the vehicle through a large opening yet, since the door even when open is relatively close to the vehicle, the vehicle can be relative close to other vehicles or structures while still allowing back-door access.

Normally as the door is opened it moves first outward somewhat, then back along the side of the vehicle. When closed it slides forward and, at the end of its travel, moves inward to fit flush with the vehicle side. To this end the tracks normally have bent-in front ends in which carriages fixed to the door ride.

The connection to the various elements in the door, for example the electrical actuator for the latch, is normally via a flexible multiconductor cable that is payed out and wound up as the door is opened and closed. This is a very sensitive element which, if damaged, prevents the door from operating. Since in the life of the vehicle the door might be opened and closed literally thousands of times, failure of this part is common.

OBJECTS OF THE INVENTION

It is therefore an object of the present invention to provide an improved motor-vehicle door-control system.

Another object is the provision of such an improved motor-vehicle door-control system which overcomes the above-given disadvantages, that is which has a long service life, in particular with respect to its electrical connections.

SUMMARY OF THE INVENTION

A motor vehicle has according to the invention a body, a door movable on the body between a closed position and an open position, an electric power source mounted in the body, and a latch having interengageable parts on the vehicle body and on the door engageable in a latched position to retain the door in the closed position, and an electrical actuator energizable to put the latch in an unlatched position. A drive on the body connected to the door is energizable from the source for moving the door between the open and closed positions and a battery is provided in the door separate from the body-mounted power source. An electronic controller in the door powered by the battery is connected to the latch actuator for operating same to unlatch the door and to a transmitter for transmitting a signal indicating the position of the door and of the latch. Another electronic controller in the body includes a receiver for receiving the signal from the transmitter in the door is connected to the drive and to the body power source for operating the drive in accordance with the signal received by the body receiver.

Thus the trouble-prone connector cable of the prior-art systems is eliminated in favor of a simple high-frequency transmitter/receiver assembly. The receiver can coact with a standard manually operable transmitter so that the receiver of the body controller can respond to signals from the further transmitter to unlatch the latch and open the door. In addition a set of manual contacts is provided on the body and door controller and is only connected together in the closed position of the door so that when the door is closed the transmitter and receiver are not needed. Thus when the door is open, which in practice is only for a very short percentage of the time, the door's own battery powers the latch and any other door subsystems. When it is closed a hard connection is made via which information can pass and through which the battery of the door can be recharged. To this end the manual contacts form a multiplex data line as well as a charging line from the power source to the battery.

The signals that are passed back and forth via the high-frequency (or even ultrasonic or infrared) link trigger latching, unlatching, locking, and unlocking of the door. They can initiate opening or closing of the door, and can turn on or turn off an antitheft or child-safety system. The transmitter can also report the condition of the door, whether it is open or closed and what position the latch is in, open, semilatched, or fully latched. The remote transmitter can initiate unlatching/opening or closing/latching of the door, as well as stop any opening or closing movement.

The body according to the invention is provided with end switches indicating the position of the door and connected to the body controller. In addition the latch includes a manually operable handle and a switch connected to the body controller for reporting the condition of the handle to the body controller.

One of the controllers according to the invention includes means for disabling an inside door handle in a child-safety position and means for stopping movement of the door when the door is blocked. The body part of the latch includes means for pulling the door tightly against the vehicle in a closed position of the door.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
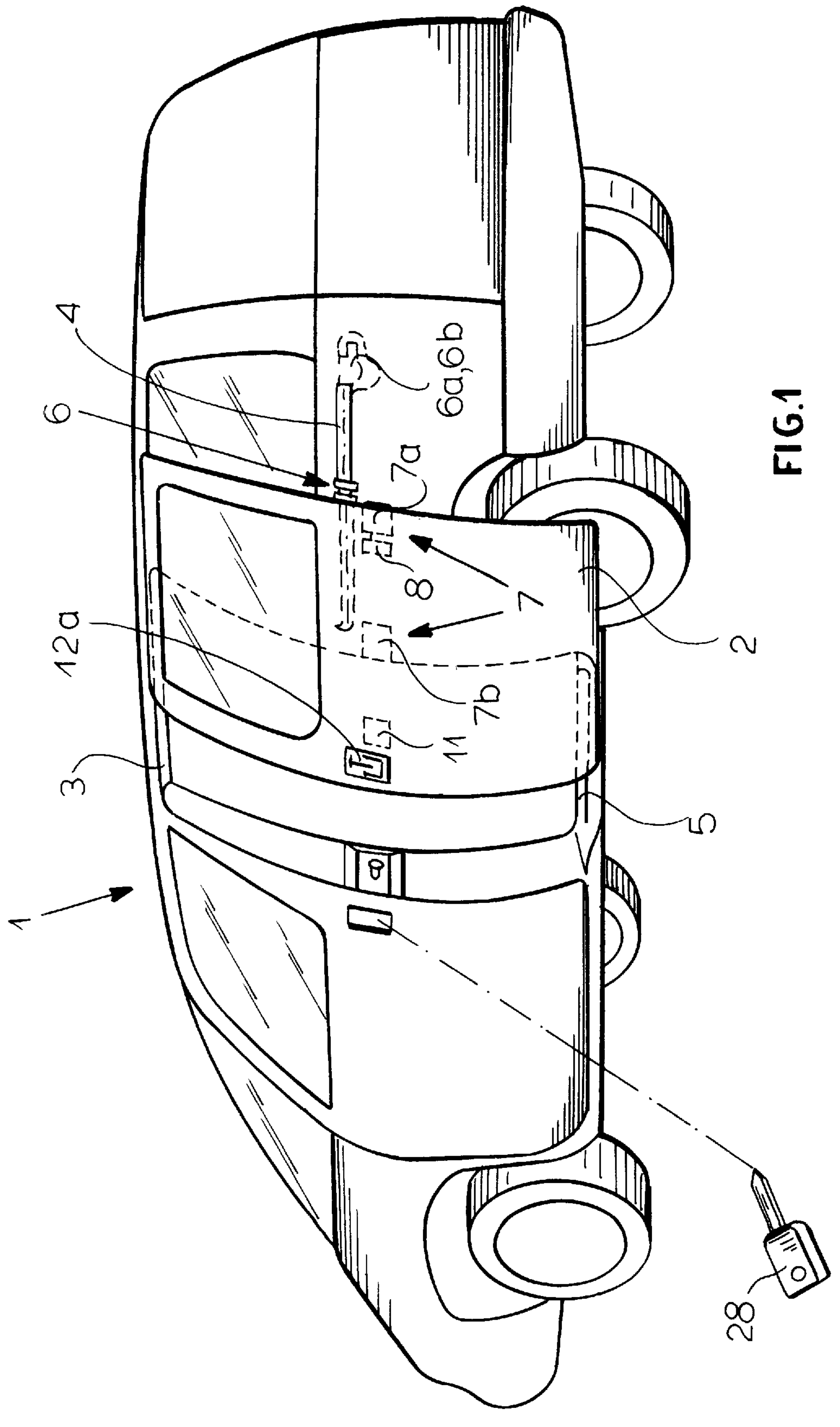
FIG. 1 is a small-scale side view of a vehicle equipped with a door system according to the invention.
Figure 1A:
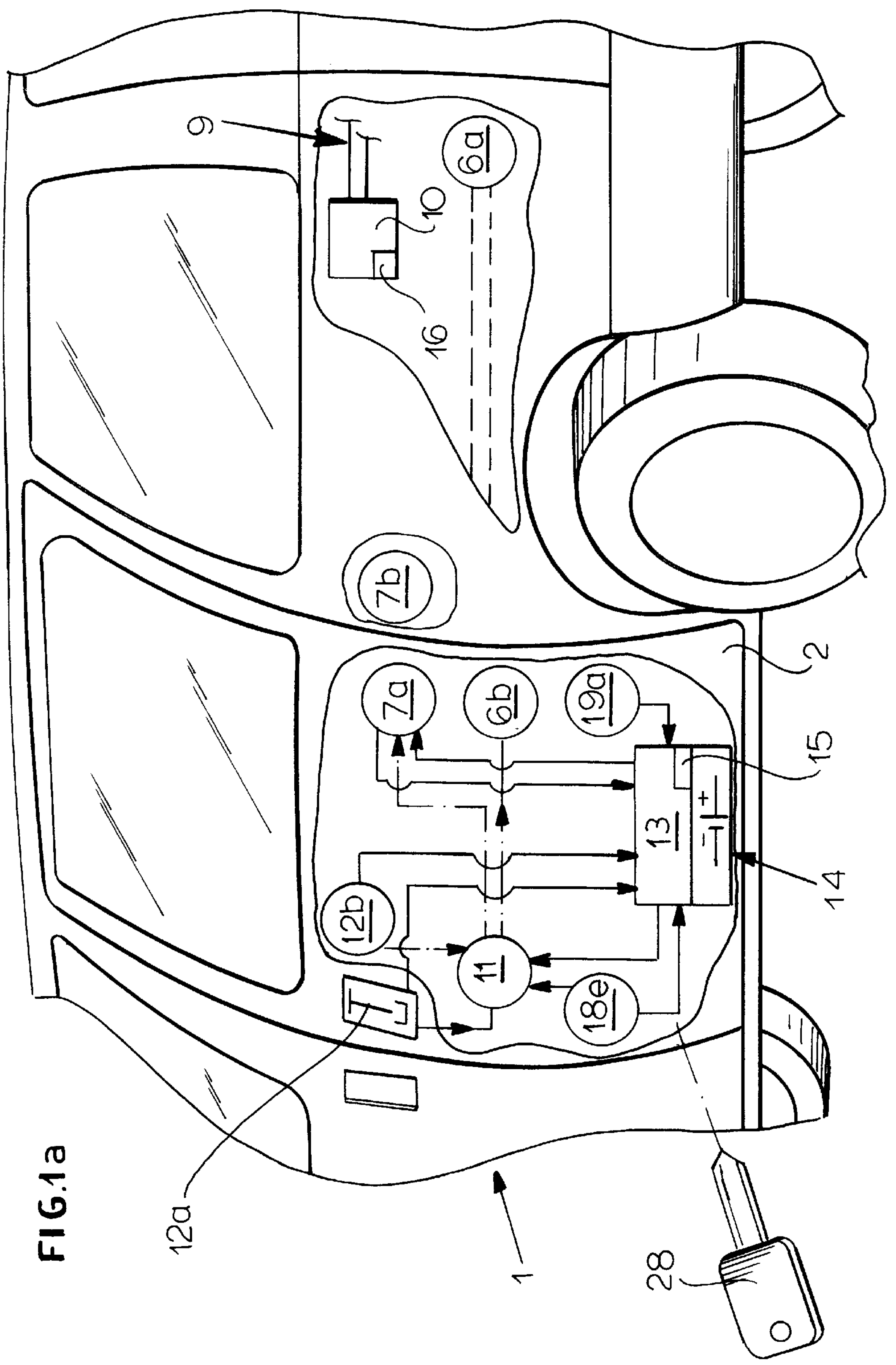
FIG. 1*a* is a larger-scale and largely diagrammatic view of details of FIG. 1.

As seen in FIGS. 1 and 1*a* a minivan 1 has a sliding door 2 carried on an upper rail 3, a middle rail 4, and a lower rail 5 and shiftable through the illustrated half-open position from a fully open to a fully closed position. The rails 3, 4, and 5 have bent-in front ends and the door 2 rides via rollers in these rails 3–5 so that as the door 2 closes it moves inward laterally to sit flush with the side of the vehicle 1, and when it is opened it first kicks out, then slides back. The actual movement can be effected as described in commonly owned patent application (attorney's 20297) by means of a toothed belt that is pushed or pulled by a drive unit shown schematically at 6.

The drive unit 6 comprises a body-mounted drive 6*a* which can be mechanically controlled and which is electrically powered via a body-mounted battery 9 (FIG. 4) and a coupling 6*b* between the unillustrated toothed belt and the door 2, so the belt can be disconnected for manual operation of the door 2. The door drive 6*a* is electronically controlled by a body-mounted controller 10 described below in greater detail. The door 2 has at least one latch assembly 7 constituted by a latch part 7*a* on the door and another latch part 7*b*, normally a keeper or bolt assembly, on the vehicle body. This latch 7 is responsible also for the final lateral closing and seal-compressing movement of the door 2 as described in commonly owned patent application (attorney's 20226).

The door 2 also carries a front control latch 11 operated by an outside handle assembly 12*a* and an inside handle assembly 12*b*. An actuator 8 for the antitheft feature and general operation of the latch 7 is carried in the door 2, connected mechanically with the latch 11. There is a mechanical connection between the following elements: outside handle assembly 12*a* and inside assembly 12*b*, antitheft actuator 8, and inside latch part 7*a*. The actuator 8 is also operated as will be described below by a central-locking controller and a child-safety cutout 18*e*. If necessary the door 2 can be unlocked, unlatched, and opened purely mechanically and similarly it can be closed, latched, and locked also purely mechanically.

Figure 2A:
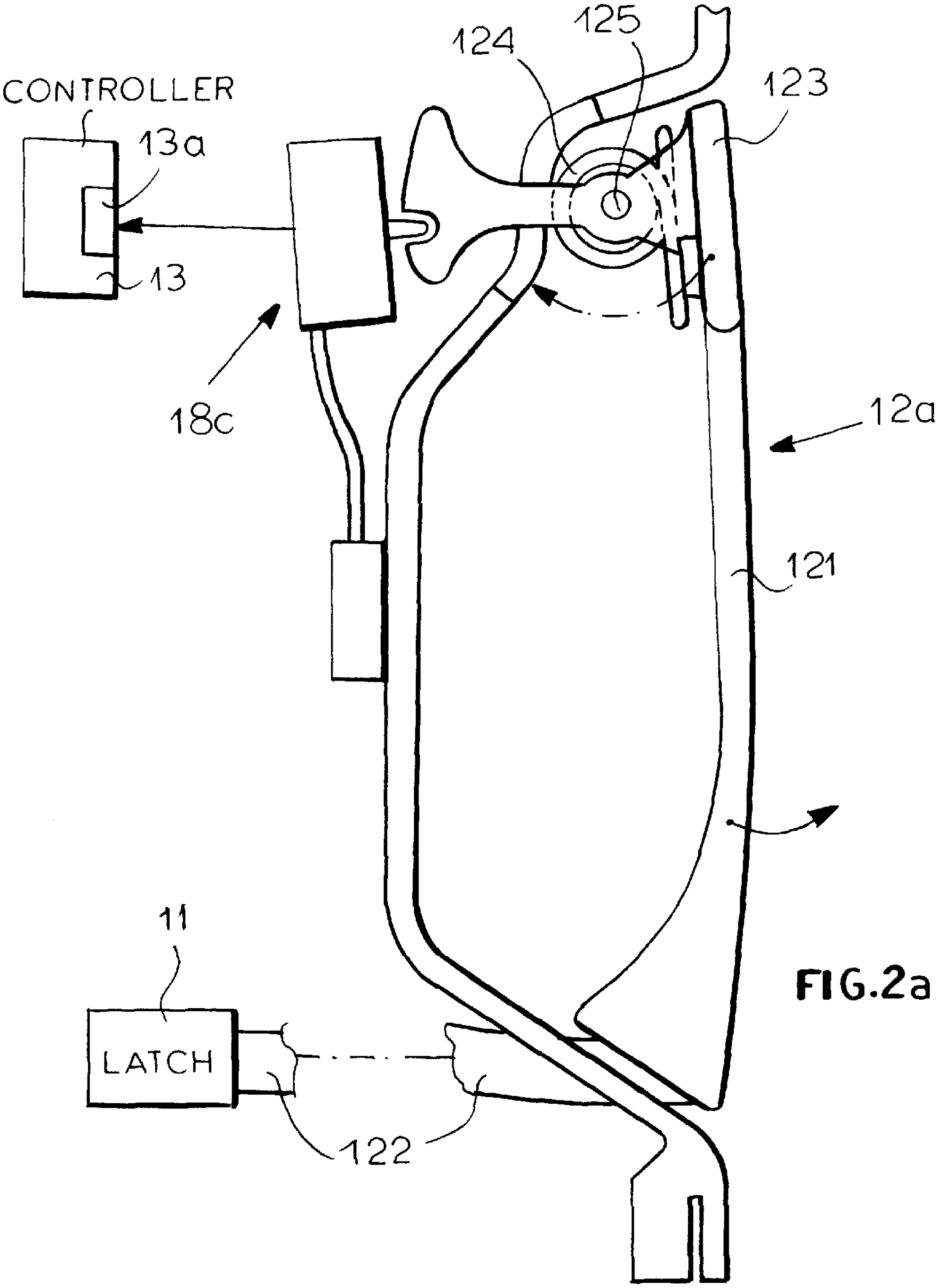
FIG. 2*a* is a large-scale partly diagrammatic side view of the handle assembly of the door.
Figure 2B:
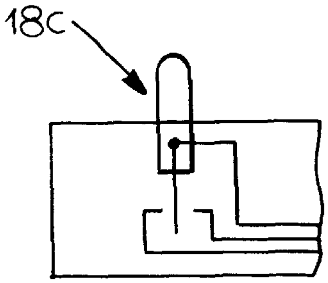
FIG. 2*b* is a schematic view of a detail of FIG. 2*a*.

FIGS. 2*a* and 2*b* show how the outside handle assembly 12*a* comprises a basically T-shaped handle 121 having a crosspiece part 123 linked to it by a spring 124. A link arm 122 extends from a lower end of the handle 121 to the front control latch 11. The crosspiece 123 has an arm that acts on a single-pole double-throw switch 18*c* (see FIG. 2*b*). When the handle 121 is lifted as shown by the solid-line arrow in FIG. 2*a* it entrains the piece 123 and actuates the switch 18*c* in one direction to trip the door drive 6 as will be described below. If for some reason the actuator 6 does not respond, further lifting of the handle 121 will manually operate the latch 11 by means of the link arm 122.

Depression of the piece 123 in the direction of the dot-dash arrow will oppositely operate the switch 18*c* so that power movement of the door 2 will be stopped and/or reversed. Thus if while the door 2 is being opened by the drive 6 the piece 123 is operated, the door 2 stops. Reactuation of the piece 123 will restart the opening or closing operation.

Figure 3A:
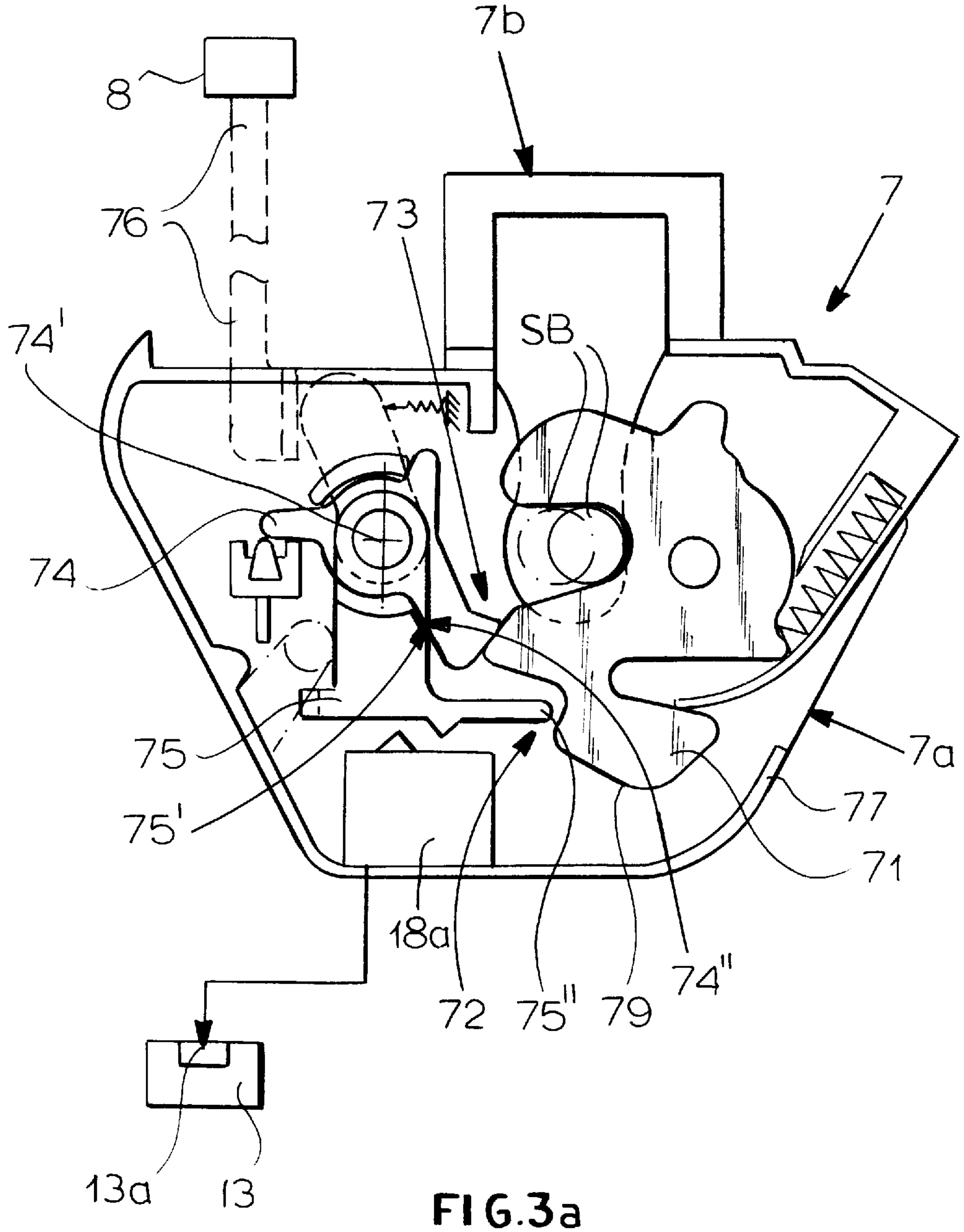
FIGS. 3*a* and 3*b* are sectional views through the latch of this invention in the fully latched and semilatched positions, respectively.
Figure 3B:
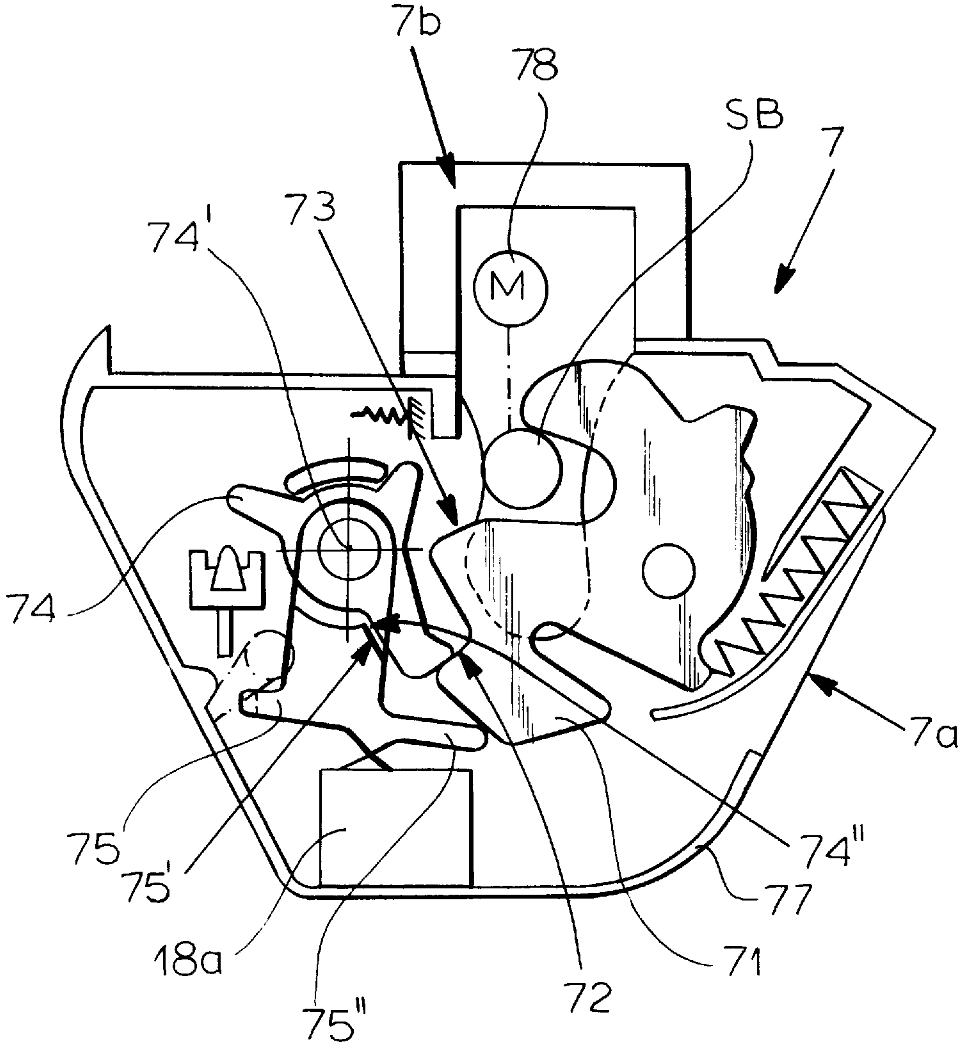

FIGS. 3*a* and 3*b* show the latch 7 and its strike or keeper 12 which basically comprises a bolt SB that can be shifted between the two positions indicated in solid and dot-dash lines in FIG. 3*a* by a mechanism such as described in U.S. Pat. No. 5,217,266. This latch 7 comprises a housing 77 normally mounted on the edge of the door 2 and the bolt SB which is normally mounted on a door post or the body of the vehicle 1. The bolt SB is movable into and out of the housing 77 and a motor illustrated schematically at 78 can also displace it limitedly in this direction as shown by the solid and dot-dash positions of FIG. 3*a*.

As is standard, the latch 7 has a fork 71 pivotal about a fork axis and formed with a cutout that can engage around the bolt SB. As the bolt SB moves into the latch the fork 71 is pivoted from an unillustrated open position to a semilatched position shown in FIG. 3*b* and into an end fully latched position shown in FIG. 3*a*. When in the fully latched position a door-mounted controller 13 operates the motor 78 to advance the bolt SB from the solid-line to the dot-dash position to pull the door 2 carrying the housing 77 very tightly closed.

A latch pawl 74 has an arm engageable with either of two steps 72 or 73 of the fork 71 in the semilatched and fully latched positions, respectively. When thus engaged the fork 71 is retained in the respective positions. This pawl 74 is pivoted about its axis 74' by a release lever 76.

A switch lever 75 has an arm 75" engageable with an edge 79 of the fork 71 in the semilatched and open positions of the fork 71 and an edge 75" engageable with an edge 75' of the pawl 4. This lever 75 is engageable with the switch 18*a* connected to the controller 13. Springs urge the fork 71 into the open position, the pawl 74 into the illustrated holding position, and the lever 75 into the FIG. 3*a*, second position.

This system works as follows:

When the door 2 is open and the fork 71 is in the unillustrated open position, its edge 79 pushes the lever 75 down and actuates the switch 18*a* into a first position so that the controller 13 cannot operate the motor 78 and the bolt SB is in its outer position.

As the door 2 is closed the fork 71 is pivoted by the bolt SB counterclockwise first into the semilatched position of FIG. 3*b*. In this position the edge 79 continues to push down the arm 75" and push the lever 75 against the switch 18*a*, preventing operation of the motor 78 by the controller 13 by retaining the switch 18*a* in the first position. In this position there is still a slight spacing between the surfaces 75' and 74" so that the pawl 74 is not acting on the switch lever 75.

With further closing of the door 1 the fork 71 is pivoted into the fully latched position of FIG. 3*a* and the arm 75" loses contact with the surface 79, so the respective spring can pivot the lever 75 back up until the surfaces 75' and 74" abut and the lever 75 loses contact with the switch 18*a*. This signals to the controller 13 that the motor 78 can be operated to shift the bolt SB and thereby pull the door very tightly closed.

When the door 2 is to be opened by pushing of the lever 76 against the pawl 4, the surface 75' pushes down against the surface 74" and moves the lever 75 down to operate the switch 18*a*. This signals to the controller 13 to reverse the motor 78 and back off the bolt SB, while at the same time the pawl 74 releases the fork 71 so the bolt SB can move out of the latch and the fork 71 can assume the open position.

Figure 4:
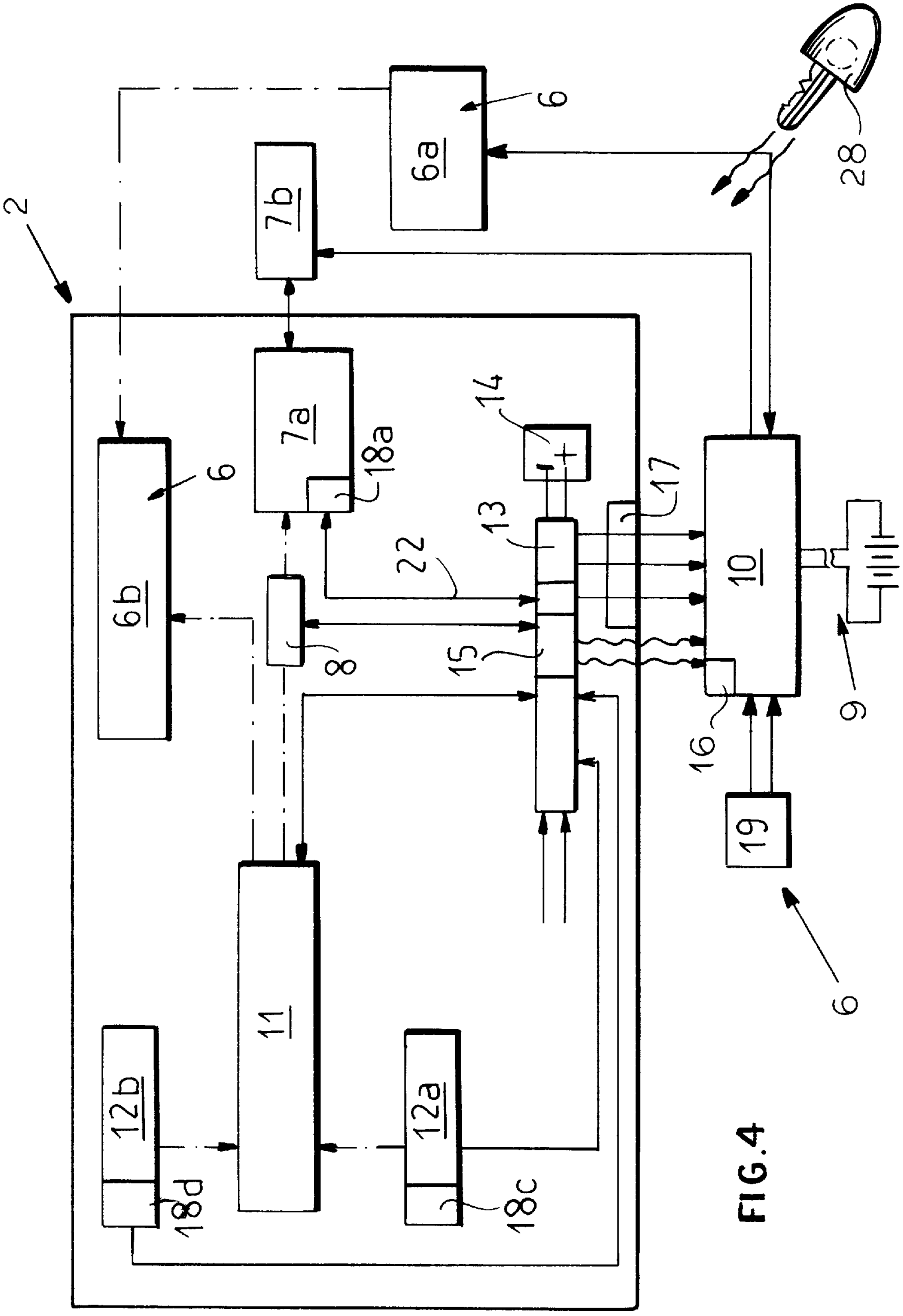
FIG. 4 is an overall schematic view of the electronic control system and mechanical elements of the door-control system of this invention.

As shown in FIG. 4, where as in FIG. 1*a* as solid lines indicate electrical connections and dot-dash lines mechanical ones, the controller 10 mounted in the body of the vehicle 1 is powered from an on-board power supply, here the van's battery 9, and the controller 13 in the door is powered by its own rechargeable battery 14 mounted in the door 2. This controller 10 is connected to the drive 6*a* and to the body part 7*b* of the latch 7, as well as to end switches 19 described below. (An alternate connection of one end switch 19*a* directly to the controller 13 is shown in FIG. 1*a*.) The connection between the controllers 10 and 13 is either by a transmitter in the controller 13 and a receiver 16 in the controller 10, or via a multiconductor connector assembly 17 that is fitted together only in the closed position of the door. This assembly 17 has a multiplex data line 20 via which it can pass control signals back and forth between the controllers 10 and 13 and a power line 21 having plus and minus lines 21*a* and 21*b* shown in FIG. 5 connected to the battery 9 for charging of the battery 14 of the controller 13 when the door 2 is closed. A further line 22 through the connector 17 reports the condition of the latch 7*a*. The body-mounted receiver 16 can respond to a signal sent out by a transmitter key 28. If the door is closed, as determined by an end switch 19*a* (FIG. 5) reception of the signal from the key 28 open the door, if it is closed as reported by another end switch 19*b* (FIG. 5) it will be opened, and if it is mid way it will stop.

Figure 5:
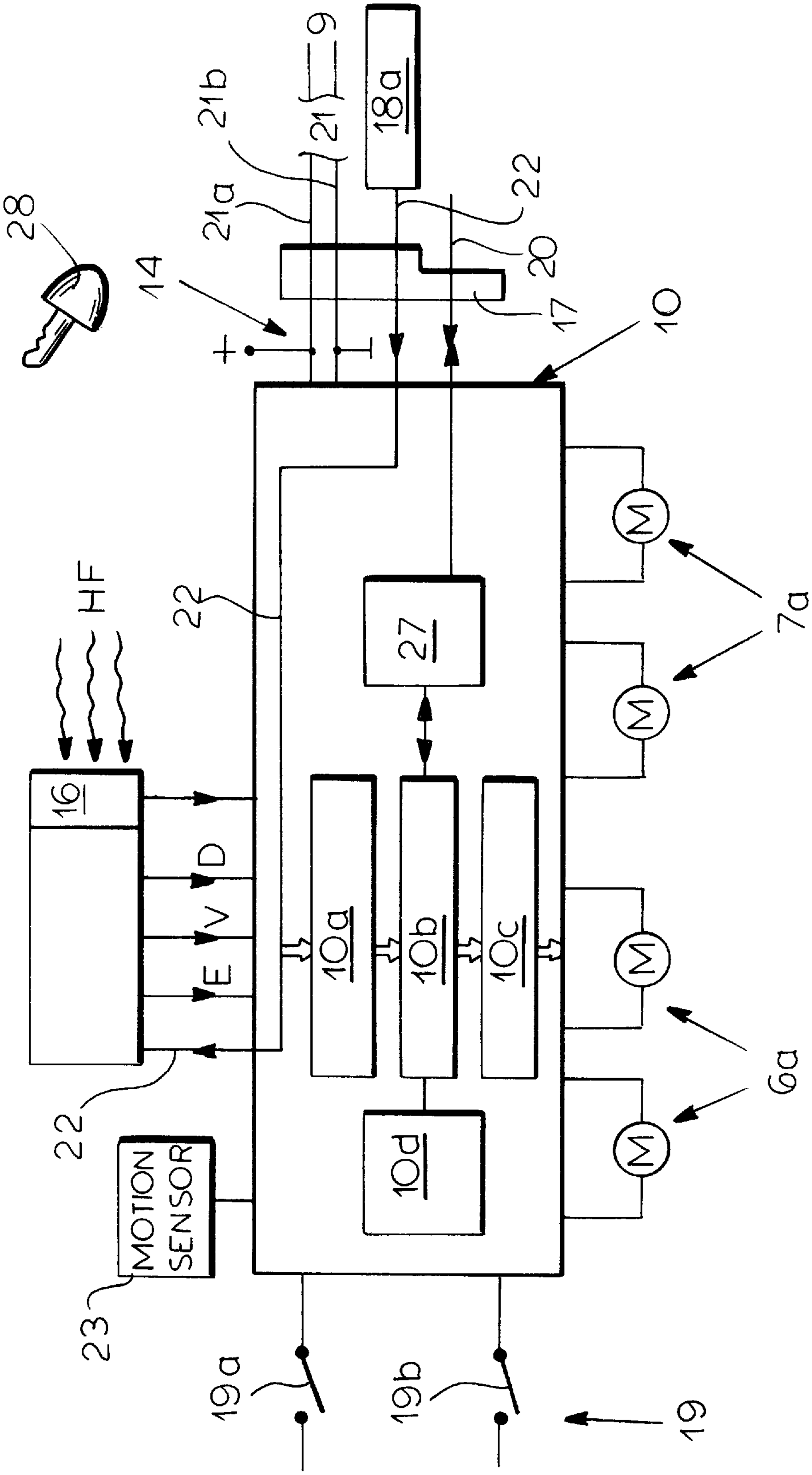
FIGS. 5 and 6 are schematic views of the body-and door-mounted controllers of this invention.

The schematic of FIG. 5 shows how the body controller 10 can operate two such door drives 6 and two such latches 7*a*. In addition a buffer 10*a* is shown in which all incoming signals are held and then fed to a multiprocessor 10*b* that in turn is connected to an output circuit 10*c*. The controller 10 mainly receives from the transmitter 10 an unlocking signal E, a locking signal V, and/or an antitheft signal D indicating the condition of the door 2. The transmitted signals can be modulated high-frequency signals of the FSK (frequency shift keying) type. The position of the switch 18*a* is reported via the line 22 to both the body controller 10 and door controller 13. A multiplex decoder 27 is provided for the signals coming through the line 20 for separating the addresses and instructions and feeding them to the appropriate elements. A further microprocessor 10*d* is provided in the controller 10 to regulate further features of the system, for instance firing an air bag and unlocking the odor when such an air bag is activated. In addition a motion sensor 23, which can be part of the wheel-rotation detector of the vehicle's antilock brake system, is provided to prevent opening of the door 2 when the vehicle 1 is in motion.

Figure 6:
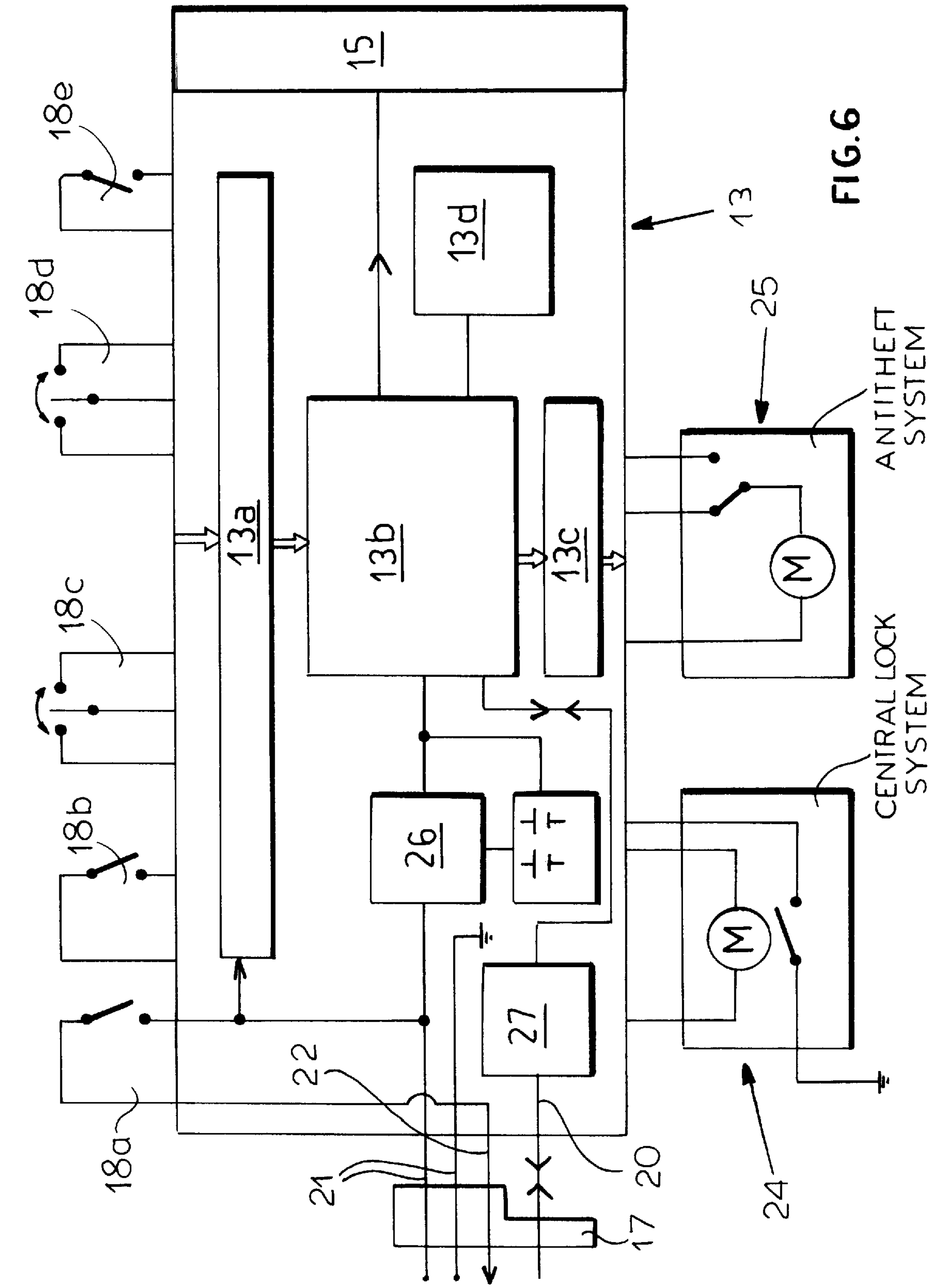

As shown in FIG. 6 the door controller 13 has the following inputs:

- The switch 18*a* indicating whether the latch 7*b* is in the fully latched position.
- A switch 18*b* that responds to current consumption of the door drive 6 to stop same if the current consumption exceeds a predetermined limit, indicating the door 2 is jammed.
- Switches 18*c* and 18*d* indicating actuation of the outside and inside handles 14*a* and 14*b*, respectively.
- The switch 18*e* for the child-safety feature that disables the inside handle 14*b*.
- A central lock system 24 having a motor that acts on the latch 7*b*.
- An antitheft system 25 also coupled to the actuator of the latch 7*b*.

In addition it has a buffer 13*a* in which all incoming signals are held and then fed to a multiprocessor 13*b* that in turn is connected to an output circuit 13*c*. Another multiplex decoder 27 is provided for the signals coming through the line 20 for separating the addresses and instructions and feeding them to the appropriate elements. A further microprocessor 13*d* is provided in the controller 10 to regulate further features of the system.

The transmitter 15 of the door controller 13 can emit the following:

Signal A. This initiates operation of the door drive 6*a* for opening the door 2. This is only possible when the fork 71 of the latch 7*a* is neither latched nor in the antitheft position. Furthermore the switch 18*c* on the outside handle 12*a* or 18*d* on the inside handle 12*b* must normally be actuated to generate signal A and the actuation must be maintained for more than a predetermined minimal time interval. If the child-safety switch 18*e* is on, signals from the inside handle 12*b* will be ignored.

Signal B. This starts the closing operation of the door 2. This signal is produced by the switch 18*c* or 18*d* and is cut off if the blocked signal is emitted by the switch 18*b*.

Signal C. This signal is only produced when the charge of the door battery 14 is too low. This low-charge condition can normally only happen if the vehicle is left standing for a long time with the door 2 open.

Signal D. This is the main latching signal produced by the fork 71. Thus the motor 78 can only be operated when the latch is in the fully latched position.

Signal E. This is a high-frequency safety signal, as compared to low-frequency signal B. It merely indicates to the body controller 10 that the door controller 13 is operational. If it is not received, the key 28 will not be able to open the door.

We claim:

1. A motor vehicle comprising:

a body;

a door movable on the body between a closed position and an open position;

an electric power source mounted in the body;

a latch having
  interengageable parts on the vehicle body and on the door engageable in a latched position to retain the door in the closed position, and
  an electrical actuator energizable to put the latch in an unlatched position;

means including a drive on the body connected to the door and energizable from the source for moving the door between the open and closed positions;

a battery in the door separate from the body-mounted power source;

electronic control means in the door powered by the battery and including
  a controller connected to the latch actuator for operating same to unlatch the door and
  a transmitter for transmitting a signal indicating the position of the door and of the latch; and electronic control means in the body including
  a receiver for receiving the signal from the transmitter in the door, and
  a controller connected to the drive and to the body power source for operating the drive in accordance with the signal received by the body receiver.

2. The vehicle defined in claim 1, further comprising a further manually operable transmitter, the receiver of the body control means being able to respond to signals from the further transmitter to unlatch the latch and open the door.

3. The vehicle defined in claim 1 further comprising a set of manual contacts connected to the body and door control means and only connected together in the closed position of the door, whereby when the door is closed the transmitter and receiver are not needed.

4. The vehicle defined in claim 3 wherein the manual contacts form a multiplex data line as well as a charging line from the power source to the battery.

5. The vehicle defined in claim 1 wherein the body is provided with end switches indicating the position of the door and connected to the body control means.

6. The vehicle defined in claim 1 wherein the latch includes a manually operable handle and a switch connected to the body control means for reporting the condition of the handle to the body control means.

7. The vehicle defined in claim 1 wherein one of the control means includes means for disabling an inside door handle in a child-safety position and means for stopping movement of the door when the door is blocked.

8. The vehicle defined in claim 1 wherein the body part of the latch includes means for pulling the door tightly against the vehicle in a closed position of the door.

* * * * *